United States Patent
Gupta et al.

(10) Patent No.: US 12,255,798 B2
(45) Date of Patent: *Mar. 18, 2025

(54) SYNTHESIZING PROBE PARAMETERS BASED ON HISTORICAL DATA

(71) Applicant: Juniper Networks, Inc., Sunnyvale, CA (US)

(72) Inventors: Rajeev Gupta, Bangalore (IN); Samta Rangare, Bangalore (IN); Prasad V, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/300,660

(22) Filed: Apr. 14, 2023

(65) Prior Publication Data
US 2023/0254235 A1    Aug. 10, 2023

Related U.S. Application Data

(63) Continuation of application No. 16/928,860, filed on Jul. 14, 2020, now Pat. No. 11,658,895.

(51) Int. Cl.
*H04L 43/12* (2022.01)
*H04L 43/0894* (2022.01)

(52) U.S. Cl.
CPC .......... *H04L 43/12* (2013.01); *H04L 43/0894* (2013.01)

(58) Field of Classification Search
CPC ..... H04L 43/12; H04L 43/0894; H04L 43/02; H04L 43/20; H04L 43/08; H04L 41/5003; H04L 41/5009
See application file for complete search history.

(56) References Cited

U.S. PATENT DOCUMENTS

| | | | |
|---|---|---|---|
| 7,554,983 B1 | 6/2009 | Muppala | |
| 8,619,562 B1 | 12/2013 | Krivitski et al. | |
| 2011/0309589 A1 | 12/2011 | Maras | |
| 2012/0311132 A1* | 12/2012 | Tychon | H04L 43/50 709/224 |

(Continued)

FOREIGN PATENT DOCUMENTS

| | | |
|---|---|---|
| CN | 107171882 A | 9/2017 |
| CN | 110278139 A | 9/2019 |

(Continued)

OTHER PUBLICATIONS

Extended Search Report from counterpart European Application No. 20200277.0, dated Mar. 15, 2021, 8 pp.

(Continued)

*Primary Examiner* — Charles C Jiang
*Assistant Examiner* — Shawn D Miller
(74) *Attorney, Agent, or Firm* — Shumaker & Sieffert, P.A.

(57) ABSTRACT

An example network device includes a memory configured to store a plurality of counts of packets of a data flow. The network device also includes one or more processors in communication with the memory. The one or more processors are configured to determine the plurality of counts of packets of the data flow, wherein each count of the plurality of counts includes a number of packets occurring in a predetermined time period. The one or more processors are configured to assign a corresponding range to each count of the plurality of counts, so as to assign a plurality of corresponding ranges. The one or more processors are also configured to determine a pattern in the plurality of corresponding ranges and send a number of active probe packets based on the determined pattern.

20 Claims, 4 Drawing Sheets

(56) References Cited

U.S. PATENT DOCUMENTS

| | | | |
|---|---|---|---|
| 2014/0012981 A1 | 1/2014 | Samuell et al. | |
| 2014/0109105 A1 | 4/2014 | Lee et al. | |
| 2018/0278629 A1* | 9/2018 | McGrew | H04L 63/1416 |
| 2018/0317221 A1 | 11/2018 | Yasukawa et al. | |
| 2020/0145313 A1 | 5/2020 | Raindel et al. | |
| 2020/0153701 A1 | 5/2020 | Mohan et al. | |
| 2020/0320270 A1* | 10/2020 | Wang | G06F 16/90344 |
| 2020/0344641 A1* | 10/2020 | Veggalam | H04W 28/0284 |
| 2021/0399947 A1 | 12/2021 | Devaraj et al. | |
| 2022/0021598 A1 | 1/2022 | Gupta et al. | |

FOREIGN PATENT DOCUMENTS

| | | |
|---|---|---|
| CN | 111193666 A | 5/2020 |
| WO | 2018/188733 A1 | 10/2018 |

OTHER PUBLICATIONS

Prosecution History from U.S. Appl. No. 16/928,860, dated Jun. 7, 2022 through Feb. 6, 2023, 94 pp.

Response to Extended Search Report dated Mar. 15, 2021, from counterpart European Application No. 20200277.0 filed Jul. 19, 2022, 20 pp.

First Office Action and Search Report, and translation thereof, from counterpart Chinese Application No. 202011047550.0 dated Mar. 27, 2024, 11 pp.

Notice of Intent to Grant and Text Intended to Grant from counterpart European Application No. 20200277.0 dated Nov. 28, 2023, 57 pp.

* cited by examiner

SYNTHESIZING PROBE PARAMETERS BASED ON HISTORICAL DATA

RELATED APPLICATIONS

This application is a continuation of U.S. patent application Ser. No. 16/928,860, filed Jul. 14, 2020, the entire contents of which is incorporated herein by reference.

TECHNICAL FIELD

The disclosure relates to computer networks.

BACKGROUND

Over the last few decades, the Internet has grown exponentially from a small network comprising a few nodes to a worldwide pervasive network that services more than a billion users. Today, individual subscribers are not limited to running a few network sessions with voice and/or data downloads over the network. Instead, the extent of services used by subscribers varies widely from multimedia gaming, audio and video streaming, web services, voice over IP (VoIP), and the like. With new technology penetration, such as increased utilization of Internet of Things (IoT) and M2M (machine to machine) communications, the network services and the software applications that a given subscriber may require also varies from a few sessions to multiple sessions having concurrent flows. This number is growing rapidly as subscribers increasingly run multiple applications, services, transactions simultaneously. The increased amount and variety of subscriber sessions and packet flows create challenges for network service providers with respect to network performance, such as latency, delay, and jitter.

SUMMARY

In general, the disclosure describes techniques for evaluating application quality of experience metrics over a software-defined wide area network in a manner that reduces the manual tuning of conventional active probes and provides more accurate measurement of application level service level agreement (SLA) metrics which may directly impact consumer experience by leading to the selection of better links to carry application traffic.

In some Software-Defined Wide Area Networks (SD-WANs), an SD-WAN routing appliance may specify a path for data flows between client devices and application servers. These paths are typically selected using SLA parameters and various metrics of the WAN links. While the SLA parameters may be more static in nature, or at least predetermined prior to the SD-WAN appliance receiving the flow, the metrics of the various WAN links may be more dynamic, as the metrics describing the capabilities of the particular WAN link may vary based on various current aspects of the network. These metrics are determined by sending probe packets on the various links and analyzing the results of the transmission to measure how the particular WAN link could handle the data flow.

Typically, application performance is monitored and measured using active probe packets. In active probing, custom probe packets are sent between devices on multiple routes to measure round-trip time (RTT), jitter, and packet loss between the devices. A network operator may configure a network to send active probes periodically on all the active and passive links. A configured number of samples are collected and used for measuring the SLA metrics. If there is a violation of the SLA detected for any application, the probe packet metrics may be evaluated to determine the best possible link for that application traffic in order to meet performance requirements of the SLA.

A common way to configure active probes is to specify required parameters statically. For example, a network operator statically configures a burst size, probe count, probe interval, and other parameters. Probing links for SLA performance in this manner with active probes has certain drawbacks. For example: 1) parameters vary for different networks; 2) network parameters may change over time even on the same network; and/or 3) probe packets generated from static values of certain parameters (for example, burst size, data size and probe count) may rarely match the actual traffic pattern. These issues may result in inaccurate SLA metrics and eventually lead to undesirable behavior of the network. For example, a traffic switch may occur from a link that is performing according the SLA parameters to an unwanted link or a traffic switch may not occur when a traffic switch should have occurred based on the SLA parameters.

Rather than manually tuning active probe packets, the techniques of this disclosure may provide for the evaluation of application quality of experience metrics over a software-defined wide area network in a manner that may provide more accurate application level service level agreement (SLA) metrics which may directly impact consumer experience by leading to the selecting of better links to carry application traffic. For example, the techniques described herein include collecting historical data of a data flow, arranging the historical data for analysis, determining a pattern in historical data, and sending a number of active probe packets based on the determined pattern.

In one example of the techniques described herein, a method includes determining a plurality of counts of packets of a data flow, wherein each count of the plurality of counts includes a number of packets occurring in a predetermined time period, assigning a corresponding range to each count of the plurality of counts, so as to assign a plurality of corresponding ranges, determining a pattern in the plurality of corresponding ranges, and sending a number of active probe packets based on the determined pattern.

In another example of the techniques described herein, a network device includes a memory configured to store a plurality of counts of packets of a data flow and one or more processors in communication with the memory, the one or more processors configured to: determine the plurality of counts of packets of the data flow, wherein each count of the plurality of counts includes a number of packets occurring in a predetermined time period; assign a corresponding range to each count of the plurality of counts, so as to assign a plurality of corresponding ranges; determine a pattern in the plurality of corresponding ranges; and send a number of active probe packets based on the determined pattern.

In another example of the techniques described herein, a non-transitory computer-readable storage medium is described, the non-transitory computer-readable storage medium storing instructions thereon that when executed cause one or more processors, to determine a plurality of counts of packets of a data flow, wherein each count of the plurality of counts includes a number of packets occurring in a predetermined time period, assign a corresponding range to each count of the plurality of counts, so as to assign a plurality of corresponding ranges, determine a pattern in the plurality of corresponding ranges, and send a number of active probe packets based on the determined pattern.

The details of one or more examples of the disclosure are set forth in the accompanying drawings and the description

DETAILED DESCRIPTION

Figure 1:
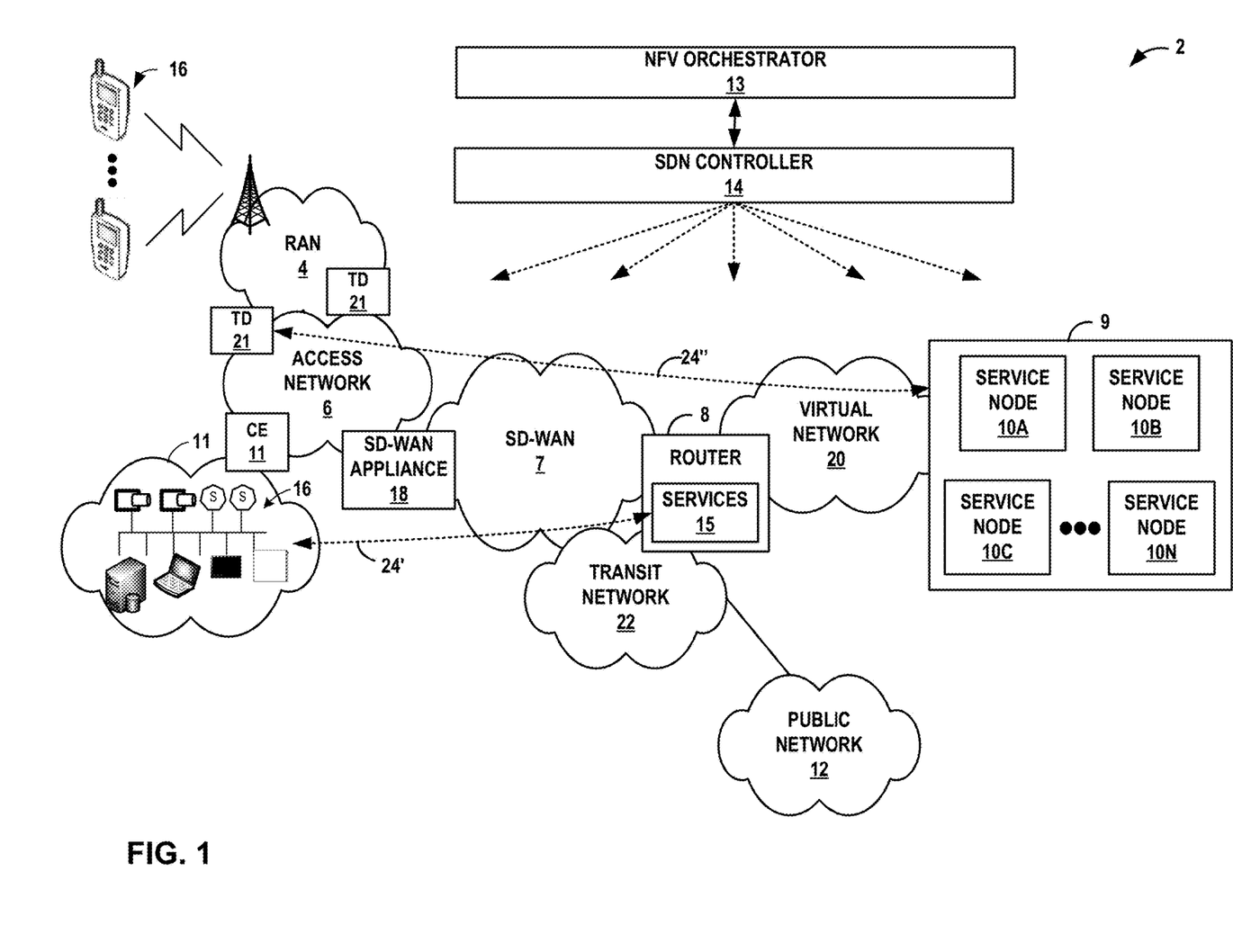
FIG. 1 is a block diagram illustrating an example software-define wide area network system that provides synthesizing probe parameters based on historical data, in accordance with the techniques of this disclosure.

FIG. 1 is a block diagram illustrating an example software-define wide area network system that provides synthesizing probe parameters based on historical data, in accordance with the examples described herein.

The example network system of FIG. 1 includes a service provider network 2 that operates as a private network to provide packet-based network services to subscriber devices 16. That is, service provider network 2 provides authentication and establishment of network access for subscriber devices 16 such that a subscriber device may begin exchanging data packets with public network 12, which may be an internal or external packet-based network such as the Internet.

In the example of FIG. 1, service provider network 2 comprises access network 6 that provides connectivity to public network 12 via service provider software-defined wide area network 7 (hereinafter, "SD-WAN 7") and router 8. SD-WAN 7 and public network 12 provide packet-based services that are available for request and use by subscriber devices 16. As examples, SD-WAN 7 and/or public network 12 may provide bulk data delivery, voice over Internet protocol (VoIP), Internet Protocol television (IPTV), Short Messaging Service (SMS), Wireless Application Protocol (WAP) service, or customer-specific application services. Public network 12 may comprise, for instance, a local area network (LAN), a wide area network (WAN), the Internet, a virtual LAN (VLAN), an enterprise LAN, a layer 3 virtual private network (VPN), an Internet Protocol (IP) intranet operated by the service provider that operates access network 6, an enterprise IP network, or some combination thereof. In various examples, public network 12 is connected to a public WAN, the Internet, or to other networks. Public network 12 executes one or more packet data protocols (PDPs), such as IP (IPv4 and/or IPv6), X.25 or Point-to-Point Protocol (PPP), to enable packet-based transport of public network 12 services.

In general, subscriber devices 16 connect to gateway router 8 via access network 6 to receive connectivity to subscriber services for applications hosted by public network 12 or router 9. A subscriber may represent, for instance, an enterprise, a residential subscriber, or a mobile subscriber. Subscriber devices 16 may be, for example, personal computers, laptop computers or other types of computing devices positioned behind customer equipment (CE) 11, which may provide local routing and switching functions. Each of subscriber devices 16 may run a variety of software applications, such as word processing and other office support software, web browsing software, software to support voice calls, video games, video conferencing, and email, among others. For example, subscriber device 16 may be a variety of network-enabled devices, referred generally to as "Internet-of-Things" (IoT) devices, such as cameras, sensors (S), televisions, appliances, etc. In addition, subscriber devices 16 may comprise mobile devices that access the data services of service provider network 2 via a radio access network (RAN) 4. Example mobile subscriber devices include mobile telephones, laptop or desktop computers having, e.g., a 3G wireless card, wireless-capable netbooks, video game devices, pagers, smart phones, personal data assistants (PDAs) or the like.

A network service provider operates, or in some cases leases, elements of access network 6 to provide packet transport between subscriber devices 16 and router 8. Access network 6 represents a network that aggregates data traffic from one or more of subscriber devices 16 for transport to/from SD-WAN 7 of the service provider. Access network 6 includes network nodes that execute communication protocols to transport control and user data to facilitate communication between subscriber devices 16 and router 8. Access network 6 may include a broadband access network, a wireless LAN, a public switched telephone network (PSTN), a customer premises equipment (CPE) network, or other type of access network, and may include or otherwise provide connectivity for cellular access networks, such as a radio access network (RAN) (not shown). Examples include networks conforming to a Universal Mobile Telecommunications System (UMTS) architecture, an evolution of UMTS referred to as Long Term Evolution (LTE), a fifth generation (5G) cellular standard, mobile IP standardized by the Internet Engineering Task Force (IETF), as well as other standards proposed by the $3^{rd}$ Generation Partnership Project (3GPP), $3^{rd}$ Generation Partnership Project 2 (3GGP/2) and the WiMAX forum.

SD-WAN appliance 18 may be a customer edge (CE) router, a provider edge (PE) router, or other network device between access network 6 and SD-WAN 7. SD-WAN 7 offers packet-based connectivity to subscriber devices 16 attached to access network 6 for accessing public network 12 (e.g., the Internet). SD-WAN 7 may represent a public network that is owned and operated by a service provider to interconnect a plurality of networks, which may include access network 6. In some examples, SD-WAN 7 may implement Multi-Protocol Label Switching (MPLS) forwarding and in such instances may be referred to as an MPLS network or MPLS backbone. In some instances, SD-WAN 7 represents a plurality of interconnected autonomous systems, such as the Internet, that offers services from one or more service providers. Public network 12 may represent the Internet. Public network 12 may represent an edge network coupled to SD-WAN 7 via a transit network 22 and one or more network devices, e.g., a customer edge device such as customer edge switch or router. Public network 12 may include a data center. Router 8 may exchange packets with service nodes 10 via virtual network 20, and router 8 may forward packets to public network 12 via transit network 22.

In examples of network 2 that include a wireline/broadband access network, router 8 may represent a Broadband Network Gateway (BNG), Broadband Remote Access Server (BRAS), MPLS PE router, core router or gateway, or Cable Modem Termination System (CMTS). In examples of network 2 that include a cellular access network as access network 6, router 8 may represent a mobile gateway, for example, a Gateway General Packet Radio Service (GPRS) Serving Node (GGSN), an Access Gateway (aGW), or a Packet Data Network (PDN) Gateway (PGW). In other examples, the functionality described with respect to router 8 may be implemented in a switch, service card or another network element or component. In some examples, router 8 may itself be a service node.

A network service provider that administers at least parts of network 2 typically offers services to subscribers associated with devices, e.g., subscriber devices 16, that access service provider network 2. Services offered may include, for example, traditional Internet access, VoIP, video and multimedia services, and security services. As described above with respect to SD-WAN 7, SD-WAN 7 may support multiple types of access network infrastructures that connect to service provider network access gateways to provide access to the offered services. In some instances, the network system may include subscriber devices 16 that attach to multiple different access networks 6 having varying architectures.

In general, any one or more of subscriber devices 16 may request authorization and data services by sending a session request to a gateway device such as SD-WAN appliance 18 or router 8. In turn, software-defined wide area network ("SD-WAN") appliance 18 may access a central server (not shown) such as an Authentication, Authorization and Accounting (AAA) server to authenticate the one of subscriber devices 16 requesting network access. Once authenticated, any of subscriber devices 16 may send subscriber data traffic toward SD-WAN 7 to access and receive services provided by public network 12, and such packets may traverse router 8 as part of at least one packet flow. In some examples, SD-WAN appliance 18 may forward all authenticated subscriber traffic to public network 12, and router 8 may apply services 15 and/or steer particular subscriber traffic to a data center 9 if the subscriber traffic requires services on service nodes 10. Applications (e.g., service applications) to be applied to the subscriber traffic may be hosted on service nodes 10.

For example, when forwarding subscriber traffic, router 8 may direct individual subscriber packet flows through services 15 executing on one or more service cards installed within router 8. In addition, or alternatively, service provider network 2 includes a data center 9 having a cluster of service nodes 10 that provide an execution environment for the mostly virtualized network services. In some examples, each of service nodes 10 represents a service instance. Each of service nodes 10 may apply one or more services to traffic flows. As such, router 8 may steer subscriber packet flows through defined sets of services provided by service nodes 10. That is, in some examples, each subscriber packet flow may be forwarded through a particular ordered combination of services provided by service nodes 10, each ordered set being referred to herein as a "service chain." As examples, services 15 and/or service nodes 10 may apply stateful firewall (SFW) and security services, deep packet inspection (DPI), carrier grade network address translation (CGNAT), traffic destination function (TDF) services, media (voice/video) optimization, Internet Protocol security (IPSec)/virtual private network (VPN) services, hypertext transfer protocol (HTTP) filtering, counting, accounting, charging, and/or load balancing of packet flows, or other types of services applied to network traffic.

In the example of FIG. 1, subscriber packet flows may be directed along a service chain that includes any of services 15 and/or services applied by service nodes 10. Once processed at a terminal node of the service chain, i.e., the last service to be applied to packets flowing along a particular service path, the traffic may be directed to public network 12.

Whereas a "service chain" defines one or more services to be applied in a particular order to provide a composite service for application to packet flows bound to the service chain, a "service tunnel" or "service path" refers to a logical and/or physical path taken by packet flows processed by a service chain along with the forwarding state for forwarding packet flows according to the service chain ordering. Each service chain may be associated with a respective service tunnel, and packet flows associated with each subscriber device 16 flow along service tunnels in accordance with a service profile associated with the respective subscriber. For example, a given subscriber may be associated with a particular service profile, which in turn is mapped to a service tunnel associated with a particular service chain. Similarly, another subscriber may be associated with a different service profile, which in turn is mapped to a service tunnel associated with a different service chain. In some examples, after SD-WAN appliance 18 has authenticated and established access sessions for the subscribers, SD-WAN appliance 18 or router 8 may direct packet flows for the subscribers along the appropriate service tunnels, thereby causing data center 9 to apply the requisite ordered services for the given subscriber. In some examples, SDN controller 14 may also provide a forwarding rule set to SD-WAN appliance 18 or router 8 for managing the forwarding path. In some examples, SDN controller 14 manages the forwarding path through all elements in data center 9 starting at router 8.

In some examples, service nodes 10 may implement service chains using internally configured forwarding state that directs packets of the packet flow along the service chains for processing according to the identified set of service nodes 10. Such forwarding state may specify tunnel interfaces for tunneling between service nodes 10 using network tunnels such as IP or Generic Route Encapsulation (GRE) tunnels, Network Virtualization using GRE (NVGRE), or by using VLANs, Virtual Extensible LANs (VXLANs), MPLS techniques, and so forth. In some instances, real or virtual switches, routers or other network elements that interconnect service nodes 10 may be configured to direct the packet flow to the service nodes 10 according to service chains.

In the example of FIG. 1, service provider network 2 comprises a software defined network (SDN) and network functions virtualization (NFV) architecture. SDN controller device 14 may provide a high-level controller for configuring and managing the routing and switching infrastructure of service provider network 2. NFV orchestrator device 13 may provide a high-level orchestrator for configuring and managing virtualization of network services into service nodes 10 of data center 9. In some instances, SDN controller 14 manages deployment of virtual machines (VMs) within the operating environment of data center 9. For example, SDN controller 14 may interact with provider edge (PE) router 8 to specify service chain information, described in more detail below. For example, the service chain information provided by SDN controller 14 may specify any combination and ordering of services provided by service nodes 10, traffic engineering information for tunneling or otherwise transporting packet flows along service paths, rate limits, Type of Service (TOS) markings or packet classifiers that specify criteria for matching packet flows to a particular service chain.

Although illustrated as part of data center 9, service nodes 10 may be network devices coupled by one or more switches or virtual switches of SD-WAN 7. In one example, each of service nodes 10 may run as VMs in a virtual compute environment. Moreover, the compute environment may comprise a scalable cluster of general computing devices, such as x86 processor-based servers. As another example, service nodes 10 may comprise a combination of general purpose computing devices and special purpose appliances. As virtualized network services, individual network services provided by service nodes 10 can scale just as in a modern data center through the allocation of virtualized memory, processor utilization, storage and network policies, as well as horizontally by adding additional load-balanced VMs. In other examples, service nodes 10 may be gateway devices or other routers. In further examples, the functionality described with respect to each of service nodes 10 may be implemented in a switch, service card, or another network element or component.

As described herein, elements within network system 2, such as SD-WAN appliance 18, perform application data monitoring using various application quality of experience (QoE) metric functions, such as real-time performance monitoring (RPM) or two-way active measurement protocol (TWAMP), for example. That is, RPM and TWAMP may be used within service provider network 2 to measure both one-way and two-way or round-trip metrics of network performance, such as path connectivity, path delay, packet jitter, packet loss, packet re-ordering, and the like, e.g., on a per-subscriber basis between network devices, also referred to as hosts or endpoints. In general, a QoE measurement architecture includes network devices that each support the used protocol and perform specific roles to start data sessions and exchange test packets for the data sessions. In the example network architecture illustrated in FIG. 1, SD-WAN appliance 18 is configured to perform the QoE metric predictions, as well as a dynamic path selection algorithm. SD-WAN appliance 18 allows for load sharing across connections and adjusts traffic flows based on network conditions to improve performance.

In some examples, the data carried by QoE active probe packets may include one or more of timestamps for sending or receiving a test packet, error estimates for sending or receiving the test packet, a sequence number for sending the test packet, a time-to-live (TTL) value for the test packet, a keepalive packet data unit (PDU), and/or a count of serviced packets, bytes, or subscribers. The one-way and two-way network performance measurements (metrics) may include keepalive or path connectivity, round trip time (RTT), path delay, packet jitter, packet re-ordering, packet loss, service latency measurements, or service load measurements based on the received data.

SD-WAN appliance 18, which performs the dynamic path selection algorithms, may determine QoE metrics, such as service level agreement (SLA) parameters that include round-trip time (RTT), jitter, and packet loss, which were influenced by applications' real-time parameters like packet size, queues and burst of packets to determine the best path.

A common way to configure active probes is to specify required parameters statically. For example, a network operator statically configures a burst size, probe count, probe interval, and other parameters. Probing links for SLA performance in this manner with active probes has certain drawbacks. For example: 1) parameters vary for different networks; 2) network parameters may change over time even on the same network; and/or 3) probe packets generated from static values of certain parameters (for example, burst size, data size and probe count) may rarely match the actual traffic pattern. These issues may result in inaccurate SLA metrics and eventually lead to undesirable behavior of the network. For example, a traffic switch may occur from a link that is performing according the SLA parameters to an unwanted link or a traffic switch may not occur when a traffic switch should have occurred based on the SLA parameters.

One approach to addressing these drawbacks may be to carry proprietary information in the actual data packet. With this approach, the computation of SLA metrics is done using actual application traffic which is more accurate than static active probes. While being more accurate, this approach is performance intensive as every packet may need to be modified to add the proprietary information. This approach may also introduce interoperability issues because of the proprietary information being carried on actual data packets.

The techniques described herein include collecting historical data for a data flow, arranging the historical data for analysis, determining a pattern in historical data, and sending a number of active probe packets based on the determined pattern. For instance, when the techniques of this disclosure are enabled for a network device, e.g., SD-WAN appliance 18, the network device may periodically determine a plurality of counts of packets of a data flow for an application. Each count of the plurality of counts may include a number of packets occurring in a predetermined time period. For example, SD-WAN appliance 18 may determine a count of the number of packets occurring within the predetermined time period that are sent along one or more paths to router 8. In some examples, SD-WAN appliance 18 may receive the plurality of counts in a periodic report from a network device, such as router 8. In other examples, SD-WAN appliance 18 may retrieve the plurality of counts in a periodic report from the network device, such as router 8. In some examples, the predetermined time period may be one second. SD-WAN appliance 18 may assign a corresponding range to each count of the plurality of counts, so as to assign a plurality of corresponding ranges. For instance, if a count records 45 packets occurring within the predetermined time period, SD-WAN appliance 18 may assign the count with a range including the recorded packet count (e.g., 25-50). SD-WAN appliance 18 may also assign a unique literal to each unique range. A literal may be any type of notation for representing the value of the range. SD-WAN appliance 18 may determine a pattern in the plurality of corresponding ranges, such as by comparing two strings of literals for an application and looking for repeated strings of literals between the two strings of literals. SD-WAN appliance 18 may then send a number of active probe packets based on the determined pattern. For example, the number of active probe packets may be based on an average number of packets of a plurality of corresponding ranges in the pattern. In this manner, the network device may send active probe packets that more closely mimic actual network function when handling actual data packets and provide better information on the actual network function.

Figure 2:
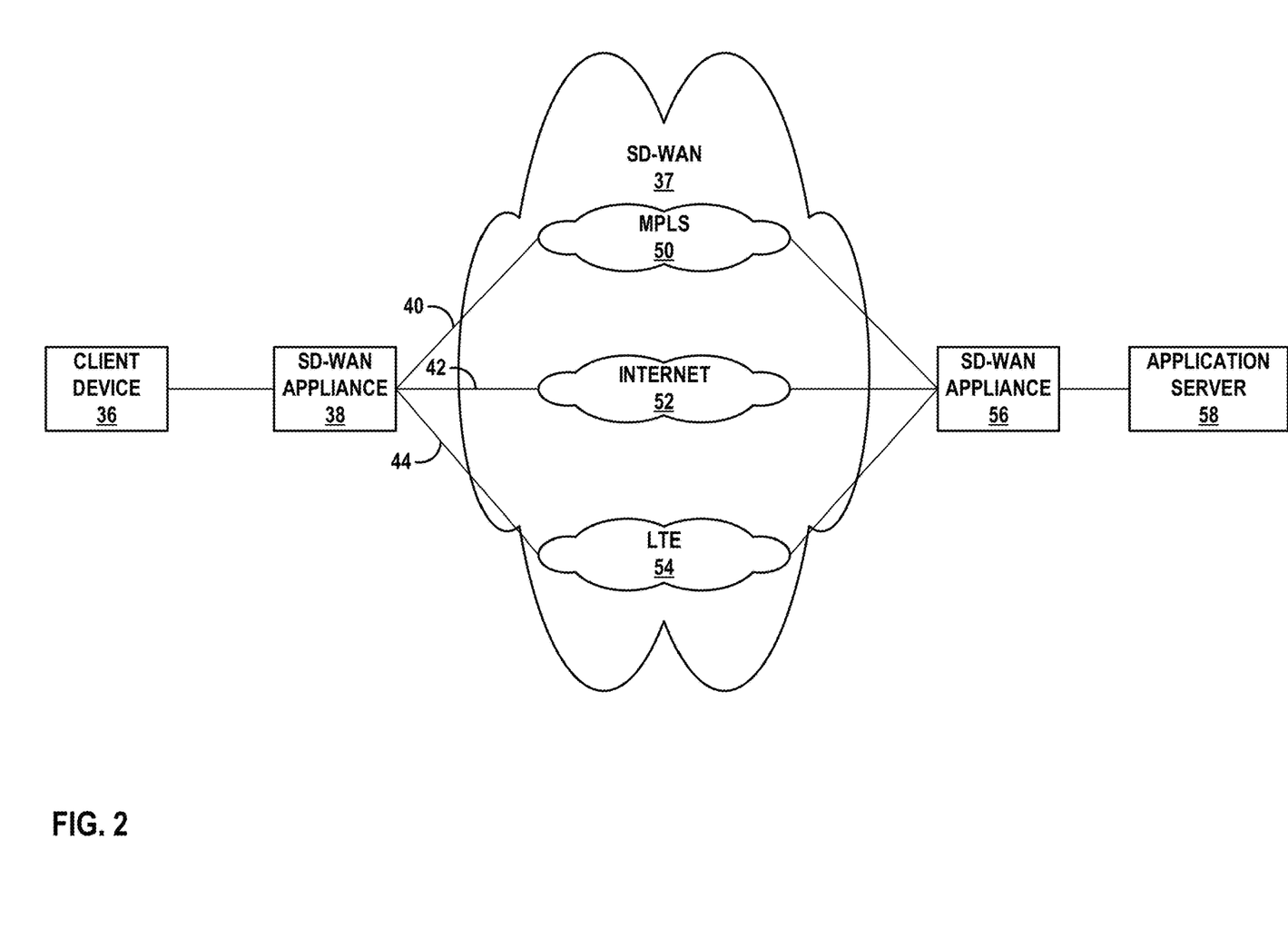
FIG. 2 is a block diagram illustrating an example software-defined wide area network, in accordance with one or more techniques of this disclosure.

FIG. 2 is a block diagram illustrating an example SD-WAN 37, in accordance with one or more techniques of this disclosure. In the example described herein, SD-WAN 7 includes three different WAN links: a first WAN link 40 coupling SD-WAN appliance 38 to a Multi-Protocol Layer Switching (MPLS) network 50, a second WAN link 42 coupling SD-WAN appliance 38 to Internet 52, and a third WAN link 44 coupling SD-WAN appliance 38 to long-term evolution (LTE) network 54. In other examples, SD-WAN 7 may include any number of links of any suitable type for transmitting data flows between the client side (e.g., client device 36 and SD-WAN appliance 38) and the application side (e.g., SD-WAN appliance 56 and application server 58).

The techniques described herein may include SD-WAN appliance 38 periodically sending active probe packets to each of the potential WAN links 40, 42, and 44 in order to keep up-to-date records of the metrics for WAN links 40, 42, and 44 such that the data flow may be routed swiftly upon receipt. For instance, when the techniques of this disclosure are enabled for SD-WAN appliance 38, SD-WAN appliance 38 may periodically determine a plurality of counts of packets on each of WAN links 40, 42, and 44 of a data flow for an application. Each count of the plurality of counts may include a number of packets occurring in a predetermined time period. SD-WAN appliance 38 may assign a corresponding range to each count of the plurality of counts, so as to assign a plurality of corresponding ranges. SD-WAN appliance 38 may also assign a unique literal to each unique range. SD-WAN appliance 38 may determine a pattern in the plurality of corresponding ranges, such as by comparing two strings of literals for an application and looking for repeated literals. SD-WAN appliance 38 may then send a number of active probe packets based on the determined pattern. In this manner, SD-WAN appliance 38 may send active probe packets that more closely mimic actual network function when handling actual data packets. SD-WAN appliance 38 may perform these techniques on each of WAN links 40, 42, and 44 to obtain current metrics for the specific WAN link.

In some instances, SD-WAN appliance 38 may perform these techniques for multiple queues in each of WAN links 40, 42, and 44. For instance, Internet link 42 may include eight different queues that are available to handle the data flow. Rather than generically send the plurality of active probe packets to internet link 42, SD-WAN appliance 38 may send each of the plurality of active probe packets to each of the plurality of queues within internet link 42 to obtain, in a more fine-grained sense, metrics for each of the queues in internet link 42. Throughout this disclosure, any technique performable on a per-link basis may also be performed on a per-queue basis within the respective link, including re-assigning data flows to other queues within the same link or re-assigning data flows from a queue in one link to a queue in a different link.

Figure 3:
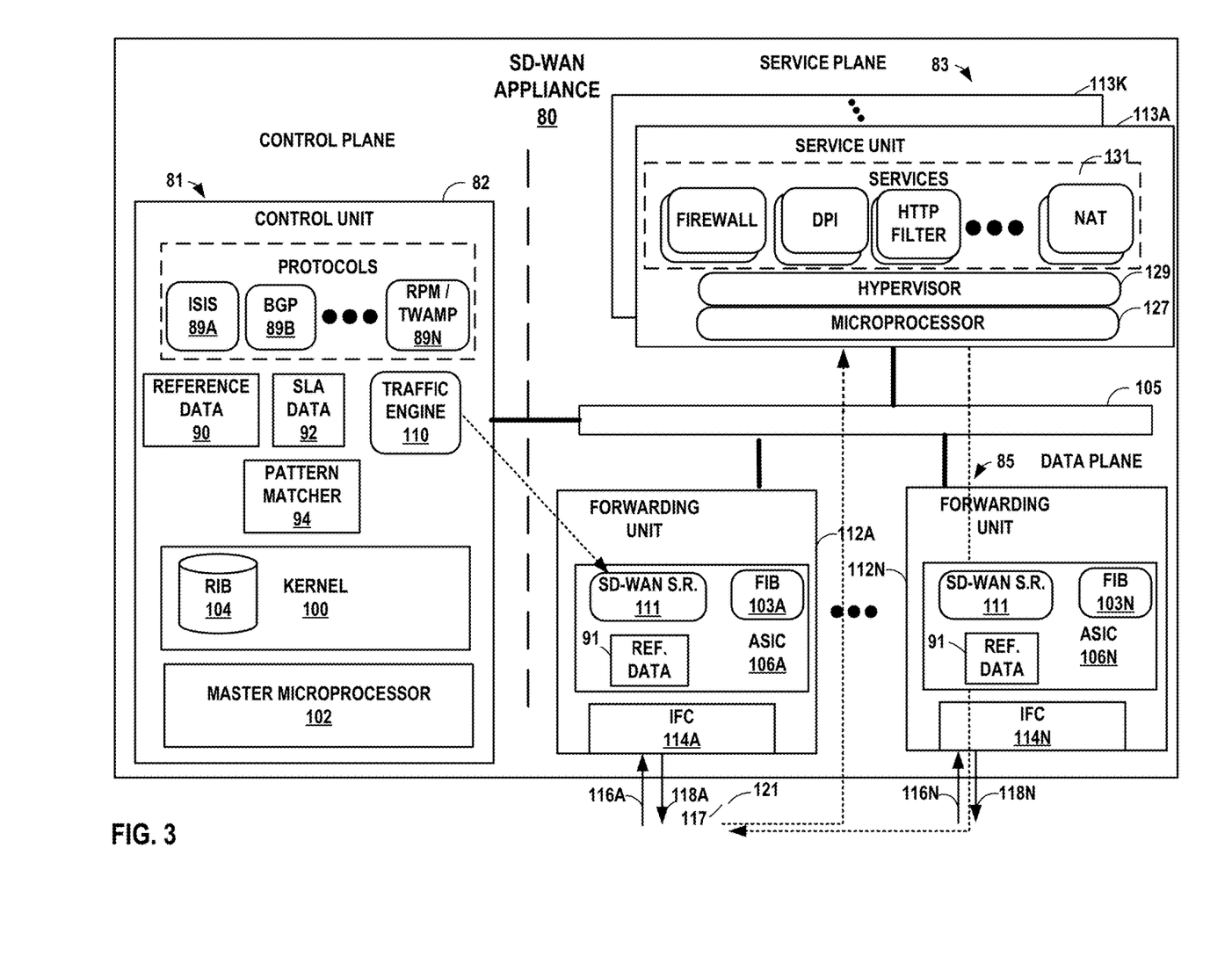
FIG. 3 is a block diagram illustrating an example software-defined wide area network appliance configured to execute one or more application quality of experience metric functions using a traffic engine, in accordance with the techniques of this disclosure.

FIG. 3 is a block diagram illustrating an example software-defined wide area network appliance 80 configured to execute one or more application quality of experience metric functions using a traffic engine 110, in accordance with the techniques of this disclosure. SD-WAN appliance 80 may be described herein within the context of service provider network 2 of FIG. 1, and may represent any of routers 8 or SD-WAN appliance 18, for example. Moreover, while described with respect to a particular network device, e.g., a router, the techniques may be implemented by any network device that may operate as a service endpoint, such as a client device, a Layer 3 (L3) or L2/L3 switch, or server. In some examples, the techniques of this disclosure may be implemented by other devices that may not operate as a service endpoint.

In this example, SD-WAN appliance 80 is divided into three logical or physical "planes" to include a control plane 81 that performs control operations for the device, a data plane 85 for forwarding transit network traffic and a service plane 83 for application of one or more network services 87 to transit packet flows that are forwarded by the router. That is, router 81 implements three separate functionalities (e.g., the routing/control, forwarding data and network service functionalities), either logically, e.g., as separate software instances executing on the same set of hardware components, or physically, e.g., as separate physical dedicated hardware components that either statically implement the functionality in hardware or dynamically execute software or a computer program to implement the functionality. In this example, a high-speed internal switch fabric 105 couples control plane 81, service plane 83, and data plane 85 to deliver data units and control messages among the units. Switch fabric 105 may represent an internal switch fabric or cross-bar, bus, or link.

In the example of FIG. 3, control plane 81 includes control unit 82 having master microprocessor(s) 102, which executes device management services, subscriber authentication and control plane routing functionality of SD-WAN appliance 80. Microprocessor 102 may comprise one or more general- or special-purpose processors such as a digital signal processor (DSP), an ASIC, a field programmable gate array (FPGA), or any other equivalent logic device. Accordingly, the terms "processor" or "controller," as used herein, may refer to any one or more of the foregoing structures or any other structure operable to perform techniques described herein. Executables, such as traffic engine 110 and services 131, may be operable by microprocessor 102 to perform various actions, operations, or functions of SD-WAN appliance 80. For example, microprocessor 102 of SD-WAN appliance 80 may retrieve and execute instructions stored by various data stores that cause microprocessor 102 to perform the operations of traffic engine 110 and services 131.

One or more storage components (e.g., RIB 104) within SD-WAN appliance 80 may store information for processing during operation of SD-WAN appliance 80 (e.g., SD-WAN appliance 80 may store data accessed by traffic engine 110 and services 131 during execution at SD-WAN appliance 80). In some examples, the storage component is a temporary memory, meaning that a primary purpose of the storage component is not long-term storage. Storage components on SD-WAN appliance 80 may be configured for short-term storage of information as volatile memory and therefore not retain stored contents if powered off. Examples of volatile memories include random access memories (RAM), dynamic random access memories (DRAM), static random access memories (SRAM), and other forms of volatile memories known in the art.

Storage components, in some examples, also include one or more computer-readable storage media. Storage components in some examples include one or more non-transitory computer-readable storage mediums. Storage components may be configured to store larger amounts of information than typically stored by volatile memory. Storage components may further be configured for long-term storage of information as non-volatile memory space and retain information after power on/off cycles. Examples of non-volatile memories include magnetic hard discs, optical discs, floppy discs, flash memories, or forms of electrically programmable memories (EPROM) or electrically erasable and programmable (EEPROM) memories. Storage components may store program instructions and/or information (e.g., data) associated with traffic engine 110 and services 131. Storage components 248 may include a memory configured to store data or other information associated with traffic engine 110 and services 131.

In general, control unit 82 represents hardware or a combination of hardware and software of control that implements control plane protocols 89A-89N ("protocols 89"), such as routing protocols to learn and maintain routing information within routing information base 104 ("RIB 104"). RIB 104 may include information defining a topology of a network, such as service provider network of FIG. 1. Routing protocols interact with kernel 100 (e.g., by way of API calls) executing on control unit 82 to update RIB 104 based on routing protocol messages received by SD-WAN appliance 80. Kernel 100 may resolve the topology defined by routing information in RIB 104 to select or determine one or more routes through the network. For example, the kernel may generate forwarding information in the form of forwarding information bases 103A-103N ("FIBs 103") based on the network topology represented in RIB 104, i.e., perform route resolution. Typically, kernel 100 generates FIBs 103 in the form of radix or other lookup trees to map packet information (e.g., header information having destination information and/or a label stack) to next hops and ultimately to interface ports of IFCs 114 associated with respective forwarding units 112. Each of FIBs 103 may associate, for example, network destinations with specific next hops and corresponding IFCs 114. For MPLS-related traffic forwarding, FIBs 103 stores, for a given FEC, label information that includes an incoming label, an outgoing label, and a next hop for a packet. Control unit 82 may then program forwarding units 112 of data plane 85 with FIBs 103, which installs the FIBs within lookup ASICs 106.

Control plane protocols 89 may also include performance measurement protocols, such as real-time performance monitoring (RPM) or two-way active measurement protocol (TWAMP), for example. That is, RPM and TWAMP may be used to measure both one-way and two-way or round-trip metrics of network performance, such as path connectivity, path delay, packet jitter, packet loss, packet re-ordering, and the like, e.g., between network devices.

Data plane 85, in this example, is a decentralized data plane in that data plane functionality and packet forwarding functionality is distributed among a plurality of forwarding units 112A-112N ("forwarding units 112"). In the example of SD-WAN appliance 80, data plane 85 includes forwarding units 112 that provide high-speed forwarding of network traffic received by interface cards 114A-114N ("IFCs 44") via inbound links 116A-116N to outbound links 118A-118N. Forwarding units 112 may each comprise one or more packet forwarding engine ("PFE") coupled to respective interface cards 114 and may represent, for example, a dense port concentrator (DPC), modular port concentrator (MPC), flexible physical interface card (PIC) concentrator (FPC), or another line card, for example, that is insertable within a chassis or combination of chassis of SD-WAN appliance 80.

As shown in the example of FIG. 3, each of forwarding units 112 includes a respective one of lookup ASICs 106A-106N ("lookup ASICs 106") that receives control and data session traffic via IFC cards 114, performs route lookups and, based on routes installed to FIBs 103, forwards the traffic either to control unit 82 (control traffic destined for SD-WAN appliance 80) or to one of forwarding units 40 (transit data traffic) for output via an interface to one of output links 48. In one example, lookup ASICs 106 are microcode-controlled chipsets programmably configured by a slave microprocessor (not shown) executing on each of forwarding units 112. Specifically, in this example, each of ASICs 106 may be controllable by internal microcode programmed by a slave microprocessor.

When forwarding packets, control logic within each lookup ASICs 106 traverses the respective FIB 103 and, upon reaching a FIB entry for the packet (e.g., a leaf node), the microcode-implemented control logic automatically selects one or more forwarding next hops (FNHs) for forwarding the packet. In this way, ASICs 106 of forwarding units 112 process packets by performing a series of operations on each packet over respective internal packet forwarding paths as the packets traverse the internal architecture of SD-WAN appliance 80. Operations may be performed, for example, on each packet based on any of a corresponding ingress interface, an ingress PFE 114, an egress PFE 114, an egress interface or other components of SD-WAN appliance 80 to which the packet is directed prior to egress, such as one or more service cards. Forwarding units 112 each include forwarding structures that, when executed, examine the contents of each packet (or another packet property, e.g., incoming interface) and on that basis make forwarding decisions, apply filters, and/or perform accounting, management, traffic analysis, and load balancing, for example.

In one example, each of forwarding units 112 arranges forwarding structures as next hop data that can be chained together as a series of "hops" along an internal packet forwarding path for the network device. In many instances, the forwarding structures perform lookup operations within internal memory of ASICs 106, where the lookup may be performed against a tree (or trie) search, a table (or index) search. Other example operations that may be specified with the next hops include filter determination and application, or a rate limiter determination and application. Lookup operations locate, within a lookup data structure (e.g., a lookup tree), an item that matches packet contents or another property of the packet or packet flow, such as the inbound interface of the packet. The result of packet processing in accordance with the operations defined by the next hop forwarding structure within ASICs 106 determines the manner in which a packet is forwarded or otherwise processed by forwarding units 112 from its input interface on one of IFCs 114 to its output interface on one of IFCs 114.

Lookup ASICs 106 may be implemented using forwarding application specific integrated circuits (ASICs), field programmable gate arrays (FPGAs), or any other equivalent integrated or discrete logic circuitry, as well as any combinations of such components. Each of forwarding units 112 may include substantially similar components to perform substantially similar functionality.

Service plane 83 of SD-WAN appliance 80 includes a plurality of service units 113A-113K ("service units 13") that may be, as examples, removable service cards, which are configured to apply network services to packets flowing through data plane 85. That is, when forwarding packets, forwarding units 112 may steer packets to service plane 83 for application of one or more network services 131 by service units 113. In this example, each of service units 113 includes a microprocessor 127 configured to execute hypervisor 129 to provide an operating environment for a plurality of network services 131. As examples, service units 113 may apply firewall and security services, carrier grade network address translation (CG-NAT), media optimization (voice/video), IPSec/VPN services, deep packet inspection (DPI), HTTP filtering, counting, accounting, charging, and load balancing of packet flows or other types of services applied to network traffic. Each of services 131 may be implemented, for example, as virtual machines or containers executed by hypervisor 129 and microprocessor 127.

In the example of FIG. 3, control unit 82 provides an operating environment for traffic engine 110. In some examples, control unit 82 may use traffic engine 110 to execute one or more TWAMP or RPM logical roles, such as a control client, a server, a sessions sender, and a session reflector.

Traffic engine 110 may be configured to perform the techniques described throughout this disclosure. For instance, traffic engine 110 may be configured to determine a plurality of counts of packets of a data flow. Each count of the plurality of counts may include a number of packets occurring in the data flow in a predetermined time period. Traffic engine 110 may assign a corresponding range to each count of the plurality of counts, so as to assign a plurality of ranges. Traffic engine 110 may determine a pattern in the plurality of corresponding ranges and send a number of active probe packets to links 118 based on the determined pattern to determine QoE metrics for the various links. Thus, in accordance with the techniques described herein, traffic engine 110 may periodically collect historical data, prepare the data for analysis, analyze the data, configure active probes and send the active probes based on the determined pattern to links 118.

The example given below may include specific metrics or sizes for various aspects of the techniques of this disclosure. These specifics are merely one example of the potential values for the techniques described herein, and other values may be determined and utilized in the application of these techniques. The listed values are used only as an example and are not limiting.

In response receiving a data flow from a client device, an application server may send the data flow to SD-WAN appliance 18 and traffic engine 110 for forwarding to the application server. The application server may be associated with any variety of applications, including social media applications, video streaming services, gaming applications, or any other application that may send and/or receive data packets to/from a client device using a data flow.

In some examples, traffic engine 110 may analyze data represented in reference data store 90 to determine a WAN link on which to send the application data packet and the data flow, which will likely satisfy SLA requirements for the application. In so doing, traffic engine 110 may also reference a data structure storing SLA requirements for applications (e.g., SLA data store 92). In an example, traffic engine 110 may determine a WAN link of the plurality of WAN links on which to send the application data packet of the data flow based on the respective set of one or more metrics for each WAN link of the plurality of WAN links. For example, traffic engine 110 may compare the metrics for the WAN links to SLA requirements for the identified application. Traffic engine 110 may then send the application data packet of the data flow to a client device via the WAN link of the plurality of WAN links.

In determining which WAN link of the plurality of WAN links on which to send the application data packet, traffic engine 110 may compare the respective set of one or more metrics, such as the number of packets, the packet size, jitter, etc., on each WAN link of the plurality of WAN links to a set of one or more service-level agreement parameters, e.g., stored in SLA data store 92. Traffic engine 110 may then select a WAN link from the plurality of WAN links that has respective metrics that most closely matches the set of one or more service-level agreement parameters as the WAN link on which to send the application data packet of the data flow.

There may be one or more advantages to using the techniques described herein. As one example, a traffic engine may determine more accurate service-level agreement (SLA) parameters by sending active probe packets that more closely model actual network traffic. In some examples, passive application probing may be eliminated, reducing network traffic and the overall bandwidth consumed on each link and increasing the efficiency of processing the incoming data flows. In passive application probing, probe packets are installed on WAN links inline with the application data path and monitor the flow through those links. The probe packets are sampled data packets, encapsulated in an IP/UDP probe header and sent in with the live traffic between endpoints to monitor the flow metrics. When compared to other application probing techniques, such as passive probing, the bandwidth consumed by the probe data may be reduced through the use of the techniques described herein, and the available bandwidth may be used instead for customer data, improving the billing efficiency for the service providers. Link overhead may also be reduced, as sampled packets are not reconstructed with application quality of experience (APPQOE) custom headers and application packets are not sent over the link.

Further, because probe packets are sent over all WAN links as described herein, WAN link performance metrics are available for all WAN links, irrespective of where the application data traffic is flowing. Instances of switching applications to different WAN links may be reduced, as advanced policy-based routing (APBR) engine has access to proactive inputs of WAN link suitability based on the probe packets, and thereby the system may reduce or avoid frequent link switching. The traffic engine may have steady/predictable probe bandwidth consumption on all links, which helps customers in capacity planning stages.

According to the techniques of this disclosure, traffic engine 110 may operate so as to combine the benefit of two approaches (active probing and passive probing) by having a variable burst pattern that more closely mimics the actual application traffic without the need to carry proprietary information on the actual application traffic. For example, traffic engine 110 may operate in phases. One phase may be collecting the historical data of a data flow. Another phase may be preparing the historical data for analysis. Another phase may be analyzing the historical data. Another phase may be configuring enhanced active probes. Another phase may be measuring network behavior. In some examples, some or all of these phases may be separate phases. In some examples, some or all of these phases may overlap or even be performed in parallel.

Collecting historical data is now discussed. Traffic engine 110 may collect historical data for a data flow from a network device, for example, router 8. For example, traffic engine 110 may collect data, such as a count of packets (e.g., the number of packets) that were processed in a predetermined time period, such as each second, for an application. In some examples, traffic engine 110 may collect such data for each application. The predetermined time period may be configured with any length of time. In other examples, traffic engine 110 may collect such data for the top predetermined number of applications by traffic volume. In some examples, traffic engine may arrange the data such as is shown in Table 1 below. The data in Table 1 is for example purposes and does not necessarily represent actual data. In some examples, traffic engine may collect this data on an intermittent or periodic basis rather than continuously, as data collection involves overhead.

TABLE 1

| Parameter | Second 1 | Second 2 | Second 3 | ... | Second N |
|---|---|---|---|---|---|
| Count of Packets | 45 | 85 | 110 | | 120 |
| Avg Packet Size | 800 | 1000 | 1100 | | 900 |

In some examples, the data to be collected may be obtained from periodic reports sent by or retrieved from network devices. These periodic reports may be sent for each session and contain information such as "application", "rx/tx packets", and average packet size, or "rx/tx bytes" (which may be used by traffic engine 110 to calculate the average packet size) by a network device, such as router 8. According to the techniques of this disclosure, the network devices, such as router 8, may be configured to send an update with the information, every predetermined period of time, such as each second, during the historical data collection phase. Traffic engine 110 may process these updates to prepare a table, such as Table 1, which may be stored in memory, such as RIB 104, or other memory in SD-WAN appliance 80 or in memory another analytical platform. In some examples, traffic engine 110 may operate in the historical data collection phase sending passive probe packets for a fixed period of time, for example, 1000 seconds, and traffic engine 110 may record the results in memory, such as RIB 104. Multiple iterations may be run for the historical data collection and multiple measurement sets may be prepared and stored. In some examples, an agent running on the network device, such as router 8, may run a command, such as a command-line interface (CLI) command, to collect the data every second and send the data to SD-WAN appliance 80 for further analysis.

In this manner, traffic engine 110 may determine a plurality of counts of packets of a data flow. Each count of the plurality of counts includes a number of packets occurring in a predetermined time period. For example, as shown in Table 1, the count of packets in second 1 is 45, the count of packets in second 2 is 85, the count of packets in second 3 is 110 and the count of packets in second N is 120 packets.

Preparing the data for analysis is now discussed. Given the continuous nature of the data, it may be advantageous to prepare the data so that the data can be analyzed to find repeated patterns. To achieve this, traffic engine 110 may assign each count value with a range based on the count value. Traffic engine 110 may also assign each unique range with a unique literal. In some examples, the literal may be a number, letter, color or any other notation. An example of this data preparation is shown in Table 2. In some examples, the ranges may be ranges of packet size or another parameter, rather than number of packets.

TABLE 2

| Parameter | Second 1 | Second 2 | Second 3 | ... | Second N |
|---|---|---|---|---|---|
| Count of Packets | 45 | 85 | 110 | | 120 |
| Range | (25-50) | (75-100) | (100-125) | | (100-125) |
| Literal | b | d | e | | e |

In the example of Table 2, traffic engine 110 may assign the count of second 1 (45) to the range of 25-50, as 45 falls within the range of 25-50. Traffic engine 110 may assign the unique literal "b" to the range of 25-50. Similarly, traffic engine 110 may assign the count of second 2 (85) to the range of 75-100 as 85 falls within the range of 75-100 and assign the unique literal "d" to the range of 75-100. Traffic engine 110 may assign the count of second 3 (110) to the range of 100-125 as 110 falls within the range of 100-125 and assign the unique literal "e" to that range. Traffic engine 110 may assign the count of second N (120) to the range 100-125 as 120 falls within the range of 100-125. The range of 100-125 would have already been assigned the unique literal of "e", so the count of second 3 and the count of second N would both have the unique literal of "e" (which represents the range of the count, namely 100-125, in this example). In this manner, traffic engine 110 may assign a corresponding range to each count of the plurality of counts of packets, so as to assign a plurality of corresponding ranges and assign each of the plurality of corresponding ranges. And as further described in this example, traffic engine 110 may assign each of the corresponding ranges with a unique literal, so as to assign a plurality of unique literals. Once the data has been prepared, traffic engine 110 may represent the data for each measurement set (e.g., for each application) in the form of strings of the unique literals. For example, traffic engine 110 may represent the data for a first measurement set of a data flow as a 30 literal long string "bdeamndlkabcdaabbcccddaajpqdfe" and the data for a second measurement set for the data flow as a 30 literal long string as "ccdfeabcdaabbcccddaadmcbacefga."

The data analysis phase is now discussed. In this phase, traffic 110 may compare the strings of unique literals for a given application to determine any recurring patterns. For example, in the string "abcpasdfasdabcasdfasdabc" there is a recurring pattern of "abc" (of length >1). Algorithmically, this data analysis may be an exponential growing issue because traffic engine 110 may need to generate the strings to be searched. For example, traffic may generate a string starting at offset 0 of length 2, length 3, etc. and also may generate strings with offsets other than 0. Traffic engine 110 may also match each generated string to appropriate data flow.

To address this potential issue, traffic engine 110 may utilize a fixed length of the string to be searched for patterns. In some examples, the fixed length may be 30, as it is a common probe-interval. However, traffic engine 110 may use other fixed lengths, such as 10, 20 or another integer length. By utilizing a fixed length string, string generation is not exponentially complex, but linearly complex. Traffic engine 110 may then utilize pattern matcher 94, such as a string searching algorithm, on each measurement set to determine the most frequently recurring string pattern. While shown outside of traffic engine 110, in some examples, pattern matcher 94 may be part of traffic engine 110. For example, one string searching algorithm that may be utilized by traffic engine 110 is Knuth-Morris-Pratt algorithm (KMP algorithm). Another string searching algorithm that may be utilized by traffic engine 110 is Rabin-Karp or Karp-Rabin algorithm. For example, between the strings of literals "bdeamndlkabcdaabbcccddaajpqdfe" and "ccdfeabcdaabbcccddaadmcbacefga" there is a repeating pattern of "abcdaabbcccddaa."

In this manner, traffic engine 110 may determine a pattern in the plurality of corresponding ranges. Once the most frequently recurring string pattern is determined, traffic engine 110 may convert the pattern to an active probe schedule shown in Table 3, (e.g., string "abcdaabbcccddaa").

TABLE 3

| Parameter | Second 1 | Second 2 | Second 3 | ... | Second N |
|---|---|---|---|---|---|
| Literal | a | b | c | | a |
| Range | (0-25) | (25-50) | (50-75) | | (0-25) |
| Avg. Packets | 13 | 38 | 63 | | 13 |

In the example of Table 3, the size of each unique range (except for literal "a") is 25. However, the size of each unique range may be any integer number. Additionally, the size of each unique range may vary between literals or may be constant among literals. In some examples, the size of a unique range may be adjusted by traffic engine 110 when a meaningful pattern is not found. For example, traffic engine 110 may increase the size of a range(s) (e.g., widen the range) to create fewer literals in the string which may increase the likelihood of finding a pattern. In other examples, traffic engine may decrease the size of a range(s) (e.g., narrow the range) to create more literals in the string which may decrease the number of patterns.

In some examples, traffic engine 110 may start with a large range to more easily identify patterns and may gradually decrement the range to reduce the number of identified patterns. In some examples, the size of the range(s) may be changed by a constant factor (e.g., the same integer number). In some examples, the size of the range(s) may be changed by a multiplier. In this manner, a traffic engine 110 may converge for most data sets and bar most anomalous ones.

Configuring enhanced active probe packets is now discussed. Currently, devices support sending a fixed number of probe packets (burst-size) per second. Traffic engine 110 may enhance the active probe packets by sending a variable number of probe packets per second based on the patterns determined by traffic engine 110. In some examples, a network device may be configured, based on the probe schedule example of Table 3 above, to send the number of active probe packets.

For example, if the pattern is a string "abcdaabbcccddaa," traffic engine 110 may send the average number of the range of packets for literal "a" in second 1, the average number of the range of packets for literal "b" in second 2, the average number of the range of packets for literal "c" in second 3, the average number of the range of packets for literal "d" is second 4, the average number of the range of packets for literal "a" in second 5, and so on. In this example, in second 1, traffic engine 110 may send 13 packets, which is the average number of the range 0-25. In second 2, traffic engine 110 may send 38 packets, which is the average number of the range 25-50. In the second 3, traffic engine 110 may send 63 packets, which is the average number of the range 50-75, and so on. In some examples, the number of active probe packets sent by traffic engine 110 in each second may not be based on an average but be another number within the range associated with the literal. In this manner, traffic engine 110 may send a number of active probe packets based on the determined pattern.

Figure 4:
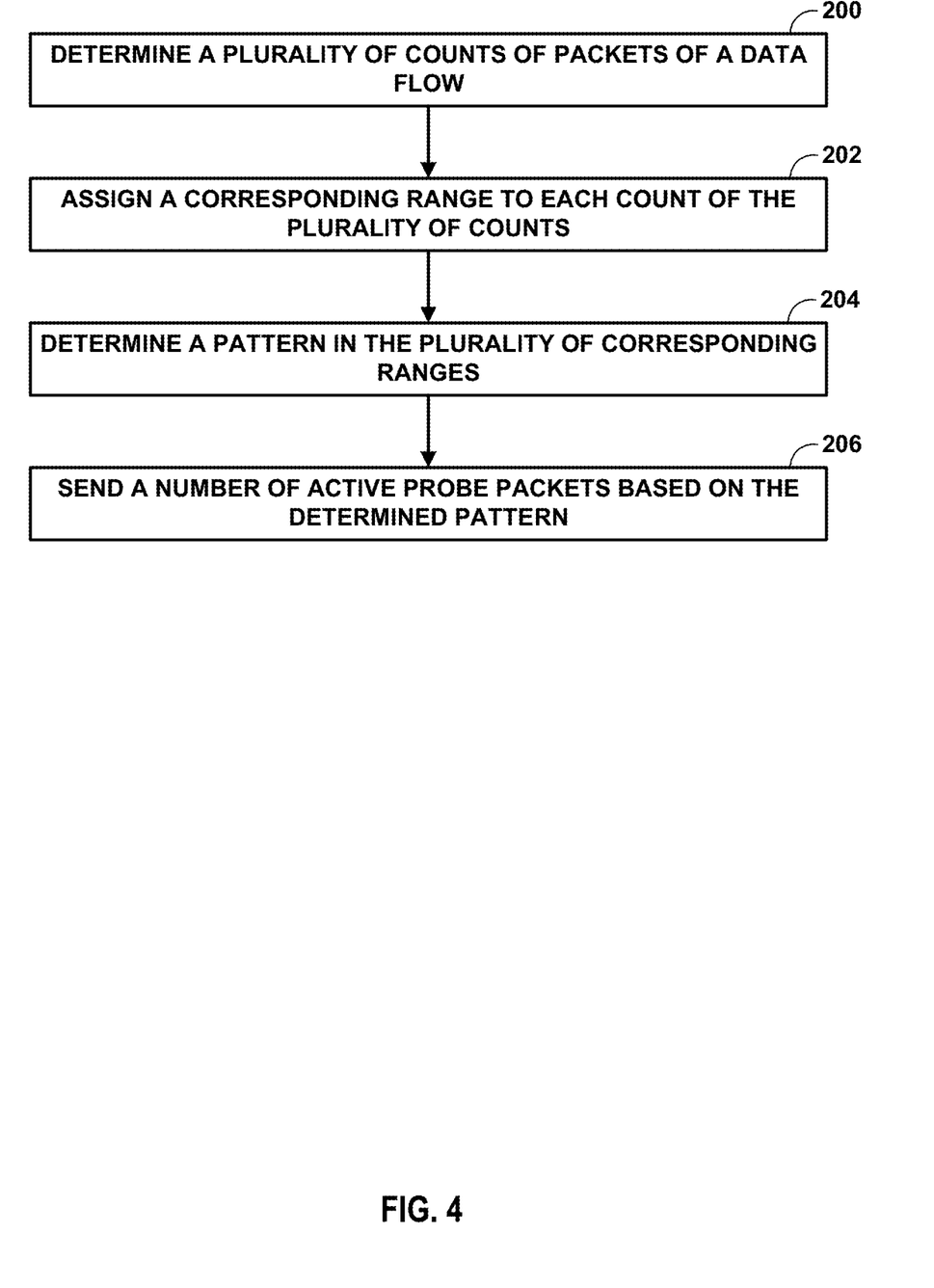
FIG. 4 is a flowchart illustrating an example of synthesizing probe parameters based on historical data according to the techniques of this disclosure.

FIG. 4 is a flowchart illustrating an example of synthesizing probe parameters based on historical data according to the techniques of this disclosure. The example in FIG. 4 is described with respective to SD-WAN appliance 18 of FIG. 1 and/or SD-WAN appliance 80 of FIG. 3. Traffic engine 110 of SD-WAN appliance 80 may determine a plurality of counts of packets of a data flow (200). Each count of the plurality of counts includes a number of packets occurring in a predetermined time period. For example, traffic engine 110 may receive or retrieve a periodic report from a network device, such as router 8 of FIG. 1, identifying a number of packets for an application processed in a given second. In one example, the count of the number of packets in second 1 may be 45. Traffic engine 110 may assign a corresponding range to each count of the plurality of counts (202). For example, traffic engine 110 may assign the count of 45 to a range of 25-50. In some examples, traffic engine 110 may assign each of the plurality of corresponding ranges with a corresponding unique literal so as to assign a plurality of unique literals. Traffic engine 110 may determine a pattern in the plurality of corresponding ranges (204). For example, traffic engine 100 may construct strings of literals for a given application and utilize a pattern matching algorithm, such as KMP algorithm or Rabin-Karp or Karp-Rabin algorithm, and compare the strings to determine the pattern in the plurality of corresponding ranges. Traffic engine 110 may determine at least one of the plurality of corresponding ranges is identical to another of the plurality of corresponding ranges when determining the pattern. For example, traffic engine 110 may determine a unique literal is repeated in the pattern, indicating at least one of the corresponding ranges is identical to another of the corresponding ranges. If in some examples a pattern is not determined, traffic engine 110 may adjust the plurality of corresponding ranges so as to widen at least one range. In other examples, traffic engine 110 may adjust the plurality of corresponding ranges so as to narrow at least one range.

Traffic engine 110 may send a number of active probe packets based on the determined pattern (206). For example, the number of active probe packets may be based on an average number of packets of a plurality of corresponding ranges in the pattern. For example, traffic engine 110 may send an average number of packets for each range for each second that was determined in the pattern, such as is shown in Table 3 above.

According to the techniques of this invention, traffic engine 110 may reduce tedious manual tuning of conventional active probes packets and provide more accurate application level SLA metrics which can directly impact consumer experience by choosing better links to carry application traffic.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

The invention claimed is:

1. A network device comprising:
one or more processors; and
a computer-readable medium having instructions stored thereon to cause the one or more processors to:
determine a first plurality of counts of packets of a data flow, wherein each count of the first plurality of counts includes a respective number of packets occurring in a respective time period of a predetermined length;
assign a corresponding range of numbers of packets to each count of the first plurality of counts, so as to assign a first plurality of corresponding ranges;
determine a second plurality of counts of packets of the data flow, wherein each count of the second plurality of counts includes a respective number of packets occurring in a respective time period of the predetermined length;
assign a corresponding range of numbers of packets to each count of the second plurality of counts, so as to assign a second plurality of corresponding ranges;
determine a repeating pattern in the data flow between the first plurality of corresponding ranges and the second plurality of corresponding ranges; and
send a number of active probe packets based on the determined repeating pattern.

2. The network device of claim 1, wherein as part of determining the repeating pattern in the data flow between the first plurality of corresponding ranges and the second plurality of corresponding ranges, the instructions cause the one or more processors to determine that at least one of the first plurality of corresponding ranges is identical to at least one of the second plurality of corresponding ranges.

3. The network device of claim 1, wherein as part of assigning the corresponding range of numbers of packets to each count of the first plurality of counts, the instructions cause the one or more processors to assign each of the first plurality of corresponding ranges with a corresponding unique literal, so as to assign a plurality of unique literals, each unique literal representing one of the first plurality of corresponding ranges.

4. The network device of claim 3, wherein as part of determining the repeating pattern in the data flow, the instructions cause the one or more processors to compare strings of the plurality of unique literals.

5. The network device of claim 4, wherein the strings of the plurality of unique literals are of a fixed length.

6. The network device of claim 4, wherein the strings of the plurality of unique literals are of an adjustable length.

7. The network device of claim 1, wherein the instructions further cause the one or more processors to adjust the first plurality of corresponding ranges so as to widen at least one range.

8. The network device of claim 1, wherein the instructions further cause the one or more processors to adjust the first plurality of corresponding ranges so as to narrow at least one range.

9. The network device of claim 1, wherein the instructions further cause the one or more processors to determine the number of active probe packets based on an average number of packets of a plurality of corresponding ranges of numbers of packets in the repeating pattern.

10. The network device of claim 1, wherein the predetermined length comprises one second.

11. A method comprising:
determining a first plurality of counts of packets of a data flow, wherein each count of the first plurality of counts includes a respective number of packets occurring in a respective time period of a predetermined length;
assigning a corresponding range of numbers of packets to each count of the first plurality of counts, so as to assign a first plurality of corresponding ranges;
determining a second plurality of counts of packets of the data flow, wherein each count of the second plurality of counts includes a respective number of packets occurring in a respective time period of the predetermined length;
assigning a corresponding range of numbers of packets to each count of the second plurality of counts, so as to assign a second plurality of corresponding ranges;
determining a repeating pattern in the data flow between the first plurality of corresponding ranges and the second plurality of corresponding ranges; and
sending a number of active probe packets based on the determined repeating pattern.

12. The method of claim 11, wherein determining the repeating pattern in the data flow between the first plurality of corresponding ranges and the second plurality of corresponding ranges comprises determining that at least one of the first plurality of corresponding ranges is identical to at least one of the second plurality of corresponding ranges.

13. The method of claim 11, wherein assigning the corresponding range of numbers of packets to each count of the first plurality of counts comprises assigning each of the plurality of corresponding ranges with a corresponding unique literal, so as to assign a plurality of unique literals, each unique literal representing one of the plurality of corresponding ranges.

14. The method of claim 13, wherein the determining the repeating pattern in the data flow comprises comparing strings of the plurality of unique literals.

15. The method of claim 14, wherein the strings of the plurality of unique literals are of a fixed length.

16. The method of claim 14, wherein the strings of the plurality of unique literals are of an adjustable length.

17. The method of claim 11, further comprising adjusting the first plurality of corresponding ranges so as to widen at least one range.

18. The method of claim 11, further comprising adjusting the first plurality of corresponding ranges so as to narrow at least one range.

19. The method of claim 11, further comprising determining the number of active probe packets based on an average number of packets of a plurality of corresponding ranges of numbers of packets in the repeating pattern.

20. Non-transitory computer-readable storage media storing instructions thereon that when executed cause one or more processors to:
determine a first plurality of counts of packets of a data flow, wherein each count of the first plurality of counts includes a respective number of packets occurring in a respective time period of a predetermined length;

assign a corresponding range of numbers of packets to each count of the first plurality of counts, so as to assign a first plurality of corresponding ranges;

determine a second plurality of counts of packets of the data flow, wherein each count of the second plurality of counts includes a respective number of packets occurring in a respective time period of the predetermined length;

assign a corresponding range of numbers of packets to each count of the second plurality of counts, so as to assign a second plurality of corresponding ranges;

determine a repeating pattern in the data flow between the first plurality of corresponding ranges and the second plurality of corresponding ranges; and send a number of active probe packets based on the determined repeating pattern.

* * * * *